Aug. 13, 1929.  H. T. KRAFT  1,724,354
METHOD OF AND APPARATUS FOR CONSTRUCTING INNER TUBES FOR TIRES
Filed Sept. 3, 1927
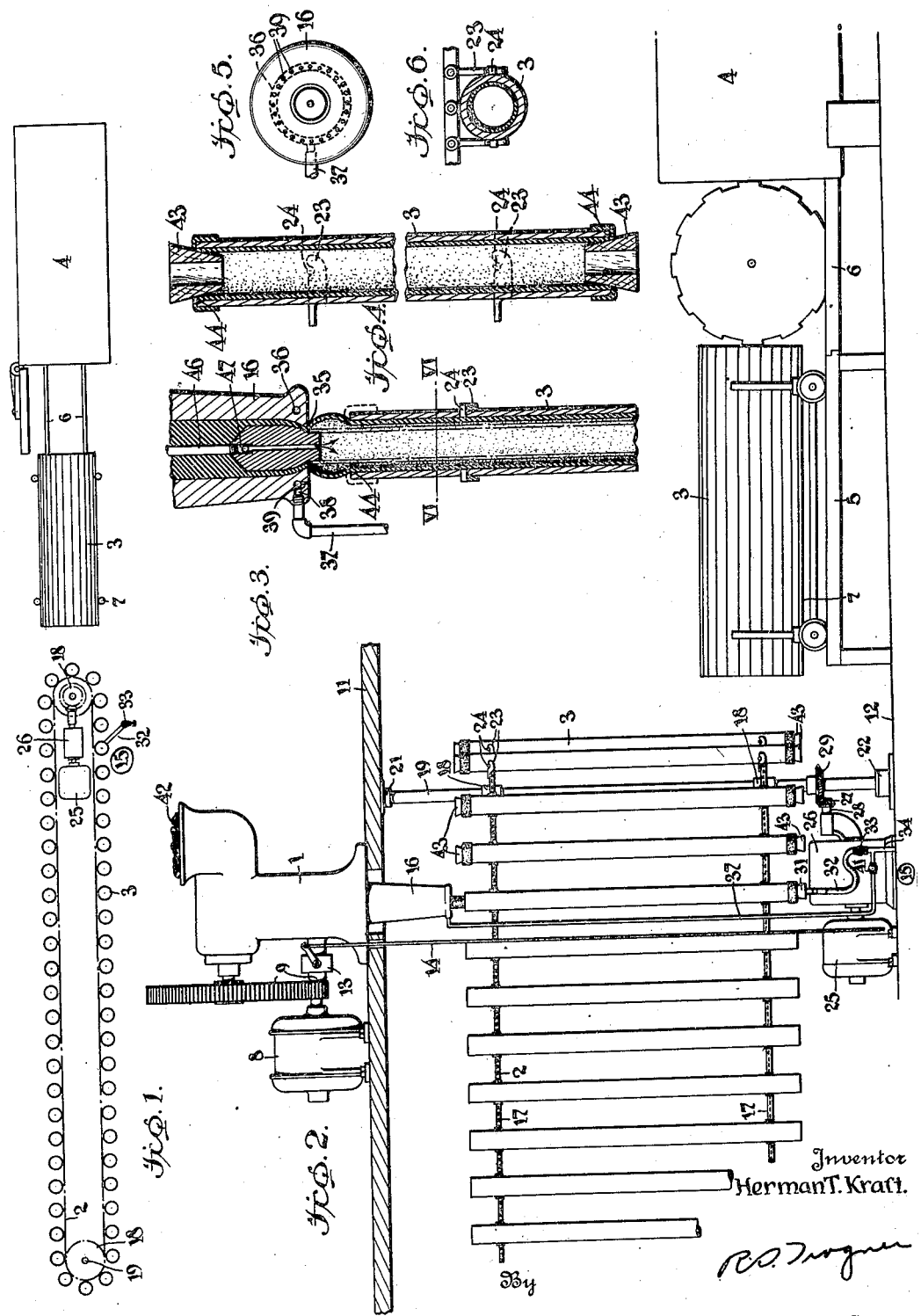
Inventor
Herman T. Kraft.
By
Attorney

Patented Aug. 13, 1929.  1,724,354

UNITED STATES PATENT OFFICE.

HERMAN T. KRAFT, OF AKRON, OHIO, ASSIGNOR TO THE GOODYEAR TIRE & RUBBER COMPANY, OF AKRON, OHIO, A CORPORATION OF OHIO.

METHOD OF AND APPARATUS FOR CONSTRUCTING INNER TUBES FOR TIRES.

Application filed September 3, 1927. Serial No. 217,453.

My invention relates to a method of and apparatus for constructing inner tubes for tires, and it is particularly directed to the manufacture of articles of the above designated character in such manner that a minimum number of operations shall be required. A primary object of the invention is to provide an efficient method of making and skiving tubes, which obviates the necessity of rolling the stock on poles, preparatory to vulcanization.

A further object of the invention is the provision of apparatus for constructing inner tubes for tires by means of which tube material is extruded directly into a hollow mandrel, where it is secured and simultaneously skived to length by the insertion of tapered plugs into the ends of the tubular material within the mandrel.

A still further object of the invention is the provision of a method of constructing inner tubes which involves the conveying of hollow mandrels consecutively into position for the reception of tube material from an extruding machine, a severing of the extruded material intermediate the mandrel and extruding machine, and a turning back of the ends of the severed section upon the ends of the mandrel.

Another object of the invention is the provision of associated instrumentalities whereby hollow mandrels are conveyed at regular intervals to an extruding device and a section of extruded stock is deposited within each mandrel. Each section of tube material is secured in its mandrel and simultaneously skived to length by the insertion of hollow tapered plugs within the ends of the mandrels, after which the mandrels are disposed within a vulcanizer to cure the sections. After the tube sections have been cured, the mandrels are returned to the extruding machine for refilling to complete the cycle of a continuous operation.

In accordance with the present practice, inner tubes are constructed by rolling the material upon the exterior of mandrels and vulcanizing the tubes thus formed. This practice requires that spacing means be positioned between the mandrels when mounting them upon a truck for vulcanization, and necessitates the employment of special devices for stripping the tubes from the mandrels after vulcanization.

My inventive concept contemplates a method and an apparatus for constructing inner tubes for tires whereby the sections of extruded material are secured within hollow mandrels and are vulcanized in that condition, which facilitates the vulcanizing operation and obviates the necessity of employing any specially designed device for removing the tubes from the mandrels.

A complete understanding of the invention may be obtained from a consideration of the following detailed description in conjunction with the accompanying drawings forming a part of the disclosure, it being understood that although the drawings disclose one embodiment of the invention, it is not confined to such illustration thereof, but may be modified as long as such modifications mark no material departure from the invention as defined by the subjoined claims. In these drawings;

Fig. 1 is a plan view illustrating, diagrammatically, the relative positions and relationship of certain of the instrumentalities employed in the practice of my invention;

Fig. 2 is a side elevational view, on a larger scale, illustrating an extrusion device and the manner in which hollow mandrels are filled and conveyed to the vulcanizer;

Fig. 3 is a detail view, partially in section and partially in elevation, illustrating the manner in which the extruded material is severed and the end of the section is turned back upon the mandrel;

Fig. 4 is a view in section illustrating a portion of extruded tubular material secured within a mandrel and skived to length by tapered plugs inserted in the ends of the mandrel;

Fig. 5 is a bottom plan view of the lower end of the nozzle of the extrusion device; and Fig. 6 is a view in section taken substantially along the line VI—VI of Fig. 3.

In the particular embodiment of the invention disclosed in the accompanying drawings, a tube extruding device 1 is associated with an endless conveyor 2 which delivers hollow mandrels 3 into operative position beneath the extrusion device. A vulcanizer 4 of known construction is conveniently located in which the tubes are cured. As shown, the vulcanizer 4 is the type in which articles to be cured are submerged in heated water or similar heated fluid. A suitable trackway 5, including a removable section 6 disposed adjacent to the vulcanizer, is provided on which trucks 7 travel to carry the mandrels 3 from the endless conveyor 2 to the vulcanizer 4, and from the vulcanizer 4 back again to the endless conveyor.

Preferably and as shown, the extrusion device 1, which is essentially of well known construction, and need not, therefore, be herein described in detail, together with suitable driving mechanism, such as a motor 8 operatively connected to the extrusion device by means of suitable coacting gears 9, are mounted on a floor 11 above a floor 12 upon which the other cooperating instrumentalities are mounted. In order that the operator may be able to control the operation of the extrusion device without frequently starting and stopping the motor, a clutch 13 is provided which is operable by means of a long rod 14 extending to a position adjacent the operator's station 15. A nozzle 16 of the extrusion machine, from which the material is discharged in tubular form, extends downwardly through the floor 11 so that the material extruded from the machine will be vertically suspended therefrom.

The endless conveyor 2 which may be of any desired construction, is so disposed that the mandrels 3 carried thereby may be consecutively positioned beneath the nozzle 16 to receive the material as it is extruded. As shown, the conveyor comprises a pair of vertically spaced chain elements 17 traveling about sprocket wheels 18 carried by upright shafts 19 journaled in suitable bearings 21 and 22 secured to the respective floors 11 and 12. Hook elements 23 are provided at spaced intervals along the chains to engage projections 24 formed upon the mandrels 3 to support the latter in an upright position. The conveyor is preferably driven by a motor 25 through a gear reduction and intermittent movement device 26, which transmits movement to one of the shafts 19 by the coaction of a bevel gear 27 on its shaft 28 with a larger bevel gear 29 on the shaft 19.

In order that the extruded tubular material may be severed as soon as a proper length thereof has been positioned in a mandrel, pneumatic means is provided and, as shown, comprises a tapered plug 31 which is supported upon the end of a flexible hose 32 and is adapted to be inserted within the end of the extruded material projecting from the lower end of the mandrel. A valve 33 is provided between the hose 32 and an air service pipe 34 in order that an operator may control a discharge of air to cause a swelling out and rupturing of the extruded material at some point between the upper end of the mandrel 3 and the lower end of the nozzle 16. The nozzle 16 is preferably formed with a sharp edge 35 in order to cause the rupture in the material to occur at that point. The employment of air pressure within the tube in its mandrel during the severing operation just described also straightens out the tube so that its outer surface engages the inner surface of the mandrel throughout its entire length.

A means is provided for causing the end of the section of extruded material which has been cut to be folded back upon the upper end of the mandrel. As shown, this means comprises a circular passageway 36 formed within the nozzle 16 and communicating with an air supply line 37 through a passageway 38. A plurality of ports 39 are provided which extend from the passageway 36 to the lower surface of the nozzle 16 and serve to eject streams of air downwardly upon the upper end of the severed section to cause the upper portion thereof to turn back upon the outer surface of the mandrel, as shown in dotted lines in Fig. 3. A valve 41, provided in the air line 37, is preferably disposed adjacent the valve 33 in order to permit convenient control thereof by the operator from his station 15.

In the practice of my invention plastic material 42 is fed to the extrusion device 1 which is intermittently operated by means of the clutch 13 to extrude material in tubular form from the nozzle 16. The hollow mandrels 3 are, in turn, positioned beneath the nozzle 16 by the conveyor 2 to receive a section of the extruded material. As soon as a desired length of material has been extruded into a mandrel the lower end thereof, which extends from the bottom of the mandrel, is turned back thereupon and the tapered plug 31 is inserted within the lower end of the mandrel. The valve 33 is opened to discharge air through the material in the mandrel which causes the material intermediate the top of the mandrel 3 and the lower end of the nozzle 16 to swell out and rupture, as shown in Fig. 3 of the drawing, such rupture occurring adjacent the nozzle by reason of the sharp edge 35. The upper end of the section thus severed is then caused to be turned downwardly about the upper end of the mandrel by opening the valve 41 to release streams of air from the ports 39.

At this stage, the section of the extruded material is disposed within the mandrel with its ends turned back upon the outside of the mandrel. Tapered hollow plugs 43 are then inserted in the ends of the section, and by engagement with the comparatively sharp inner edges 44 of the mandrel skive the ends of the section within the mandrel to tube length. The positioning of the plugs 43 in the ends of the mandrels also serves to retain the sections in position within the mandrels.

The mandrels are then removed from the conveyor and stacked upon a truck 7, which is moved along the trackways 5 and 6 into the vulcanizer 4, where the sections, within the mandrels, are submerged in a heating fluid, such as water, and cured.

It is important to note that more of the mandrels may be disposed upon a truck and treated at a single time within the vulcanizer than would be possible by the present practice of forming the tubes upon the exterior of the mandrels. This is possible by reason of the fact that no spacing elements are needed between the mandrels as the tubes are contained therein and adjacent tubes cannot possibly contact one with another. It will also be observed that since the tapered plugs are hollow, the vulcanizing fluid in the vulcanizer comes into direct contact with the inner surface of the sections being cured.

When the sections or tubes are fully cured, the truck 7 is moved back along the trackways 5 and 6 to a point adjacent the endless conveyor 2. The plugs are then removed from the mandrels and the mandrels are replaced upon the endless conveyor. The cured tubes may be easily removed from the mandrels either at the same time that the plugs are removed or at any desired point along the conveyor. The mandrels 3 then travel back to their position beneath the nozzle 16 for refilling.

Although I have shown and described a particular means for severing sections of tubing from extruded material, and for turning back the upper ends of the severed sections upon mandrels, it is obvious that other means may be employed to effect such results. Inasmuch as soapstone is fed down through the pipe 46 into the tube in the usual manner, as it is extruded, it is entirely practical for an operator to sever the tube with ordinary shears and turn it back upon the mandrel by hand. As shown in Fig. 3 of the drawing, a check valve 47 is provided to prevent the air from traveling upward into the pipe 46 during the tube severing operation.

From the foregoing description it will be observed that I have provided an apparatus for and a method of producing inner tubes with greater facility than has heretofore been possible. By enclosing the tube within the hollow mandrel instead of forming it upon the outside of the mandrel, no spacing strips are needed between the mandrels in stacking the latter on a truck preparatory to vulcanization, whereby a greater number of tubes may be vulcanized at a single operation in a vulcanizer of given size, and the use of a special stripping machine is obviated because the tubes are readily removable from the mandrels after vulcanization.

What I claim is:

1. In a method of constructing an inner tube, the step of extruding a tube of material into a mandrel.

2. The method of constructing an inner tube which includes extruding a tube of material into a mandrel, cutting off a section of the extruded material and securing it within the mandrel.

3. The method of constructing an inner tube which includes extruding a tube of material into a mandrel, cutting off a section of the extruded material and securing it within the mandrel by the insertion of tapered plugs into the ends of the tube and mandrel.

4. The method of constructing an inner tube which includes extruding a tube of material into a mandrel, cutting off a section of the extruded material, securing it within the mandrel and skiving the section to length by the insertion of tapered plugs into the ends of the section and mandrel.

5. The method of constructing an inner tube which includes extruding a tube of material into a mandrel, cutting off a section of the extruded material, securing it within the mandrel, skiving the section to length by the insertion of tapered plugs into the ends of the section and mandrel, and curing the tube while within the mandrel.

6. The method of constructing an inner tube which includes extruding a tube of material into a mandrel, cutting off a section of the extruded material, securing it within the mandrel, skiving the section to length by the insertion of hollow tapered plugs into the ends of the section and mandrel, and submerging the mandrel with the enclosed tube section in heated water.

7. The method of constructing an inner tube which includes extruding a tube of material into a mandrel, cutting off a section of the extruded material which is longer than the mandrel, turning the ends of the section back over the ends of the mandrel, and securing the enclosed portion of the section in position within the mandrel by the insertion of tapered plugs into the ends of the section and mandrel.

8. The method of constructing an inner tube which includes extruding a tube of material into a mandrel, cutting off a section of the extruded material which is longer than the mandrel, turning the ends of the section back over the ends of the mandrel, securing the enclosed portion of the section in position within the mandrel and simultaneously skiving the section to length.

9. The method of constructing inner tubes which includes conveying a plurality of mandrels consecutively into operative position with respect to an extrusion machine, extruding a tube of material into each mandrel while in such position, severing the extruded tube of material as each mandrel receives a section thereof, securing each section within its mandrel by the insertion of plugs into the ends of the section and mandrel, and vulcanizing the section while within the mandrel.

10. The method of constructing inner tubes which comprises conveying a plurality of hollow mandrels consecutively into operative position with respect to a tube extrusion device, extruding a tube of material into each mandrel while in such position, severing the extruded tube of material as each mandrel receives a section thereof, securing each section in its mandrel, simultaneously skiving it to length by the insertion of hollow tapered plugs into the ends of the sections and mandrels, submerging the sections while within the mandrels in heated water, removing the plugs and cured sections from the mandrels and conveying the mandrels into position for refilling.

11. The method of constructing inner tubes which includes conveying a plurality of mandrels consecutively into operative position beneath an extrusion device, extruding a tube of material into each mandrel while in such position, severing the extruded tube of material as each mandrel receives a section thereof, securing each section within its mandrel and skiving it to length by the insertion of exteriorly tapered hollow plugs into the ends of the sections and mandrels.

12. The method of constructing inner tubes which includes conveying a plurality of mandrels consecutively into operative position beneath an extrusion device, extruding a tube of material into each mandrel while in such position, severing the extruded tube of material as each mandrel receives a section thereof, securing each section within its mandrel, skiving it to length by the insertion of hollow exteriorly tapered plugs into the ends of the sections and mandrels and vulcanizing the sections while in the mandrels.

13. Apparatus for constructing inner tubes including an extrusion device, a plurality of hollow mandrels, means for driving the extrusion device and means for consecutively conveying the mandrels into position to receive therein material from the extrusion device.

14. Apparatus for constructing inner tubes including an extrusion device, a plurality of hollow mandrels, means for driving the extrusion device and means for consecutively delivering the mandrels in upright position beneath the extrusion device to receive material extruded therefrom.

15. Apparatus for constructing inner tubes including an extrusion device adapted to discharge tubular material downwardly, a plurality of hollow mandrels, means for consecutively positioning the mandrels in upright position beneath the extrusion device to receive a section of tubular material and means for severing the extruded tube adjacent the extrusion device.

16. Apparatus for constructing inner tubes including an extrusion device adapted to discharge tubular material downwardly, a plurality of hollow mandrels, means for consecutively positioning the mandrels in upright position beneath the extrusion device to receive a section of tubular material, means for severing the extruded tube adjacent the extrusion device, and means associated with the extrusion device for turning the upper end of the section of material thus cut off back upon its mandrel.

17. Apparatus for constructing inner tubes including an extrusion device, a conveyor juxtaposed thereto, means for supporting hollow mandrels upon the conveyor, and means for driving the conveyor to deliver the mandrels in turn into position to receive therein material extruded by the extrusion device.

18. Apparatus for constructing inner tubes comprising a tube extrusion device, a conveyor juxtaposed thereto, a plurality of hollow mandrels, means for supporting the mandrels in upright position upon the conveyor, means for driving the conveyor to consecutively position the mandrels in position for receiving material from the extrusion device, means for application to the end of the extruded material as it reaches the end of each mandrel for causing the severance of the material adjacent the extrusion device, and means associated with the extrusion device for turning back the upper end of the section thus cut off upon its mandrel.

19. Apparatus for constructing inner tubes comprising a tube extrusion device, means for remotely controlling operation of the extrusion device, a conveyor juxtaposed thereto, a plurality of hollow mandrels, means for supporting the mandrels in upright position upon the conveyor, means for driving the conveyor to consecutively position the mandrels in position for receiving material from the extrusion device, means for application to the end of the extruded material as it reaches the end of each mandrel for causing the severance of the material adjacent the extrusion device, and means associated with the extrusion device for turning back the upper end of the section thus cut off upon its mandrel.

20. The method of constructing an inner tube which includes extruding a tube of material into a hollow mandrel and subjecting the interior of the tube to fluid pressure to cause severance thereof.

21. The method of constructing an inner tube which includes extruding a tube of material into a hollow mandrel, subjecting the interior of the tube to fluid pressure to cause severance thereof, and directing fluid pressure against the severed portion to turn its end portion back upon the mandrel.

22. The method of constructing an inner tube which includes extruding a tube of material into a hollow mandrel, severing the tube adjacent an end of the mandrel, and directing fluid pressure against the tube to turn its end portion back upon the mandrel.

In witness whereof, I have hereunto signed my name.

Signed at Akron, in the county of Summit, and State of Ohio, this 2nd day of September, 1927.

HERMAN T. KRAFT.